United States Patent [19]

Schoon

[11] Patent Number: 4,683,551
[45] Date of Patent: Jul. 28, 1987

[54] RAM CLOCK SWITCHING CIRCUITRY FOR A LASER BEAM PRINTER

[75] Inventor: David J. Schoon, North Branch, Minn.

[73] Assignee: Minnesota Mining and Manufacturing Company, St. Paul, Minn.

[21] Appl. No.: 594,211

[22] Filed: Mar. 28, 1984

[51] Int. Cl.[4] .................................... G06F 13/00
[52] U.S. Cl. .................................... 364/900
[58] Field of Search ... 364/200 MS File, 900 MS File; 358/290, 342; 307/141; 328/55; 179/18; 365/189; 354/7

[56] References Cited

U.S. PATENT DOCUMENTS

| | | | |
|---|---|---|---|
| 3,980,993 | 9/1976 | Bredart et al. | 364/200 |
| 4,095,265 | 6/1978 | Urba | 364/200 |
| 4,217,637 | 8/1980 | Faulkner et al. | 364/200 |
| 4,295,205 | 10/1981 | Kunstadt | 364/900 |
| 4,302,782 | 11/1981 | Gunning et al. | 358/296 |
| 4,490,581 | 12/1984 | Edwards et al. | 179/18 |
| 4,499,536 | 2/1985 | Gemma et al. | 364/200 |
| 4,520,458 | 5/1985 | Hattori et al. | 364/900 |
| 4,558,436 | 12/1985 | Wagensonner et al. | 365/189 |
| 4,564,864 | 1/1986 | Maeshima | 358/296 |

Primary Examiner—Archie E. Williams, Jr.
Assistant Examiner—C. H. Lynt
Attorney, Agent, or Firm—Donald M. Sell; James A. Smith; Robert L. Marben

[57] ABSTRACT

Random access memory (RAM) clock switching circuitry for a laser printer having a RAM for storage of microprocessor information plus storage of font information with separate clock generators is provided for use in accessing the two types of information. The switching circuitry has a switch portion for alternately connecting the clock generators to a lockout circuit portion. A lockout request signal from the laser printer microprocessor determines when clock pulses presented to the lockout circuit can be applied to the RAM.

2 Claims, 2 Drawing Figures

RAM CLOCK SWITCHING CIRCUITRY FOR A LASER BEAM PRINTER

BACKGROUND OF THE INVENTION

The invention presented herein relates to a microprocessor controlled laser beam printer using a writing duty cycle of less than 50% and having a single random access memory (RAM) for storage of font information for the laser output control and storage of information for the microprocessor and, in particular, to circuitry for such a printer for switching between two clock sources for addressing the RAM, one clock source for accessing the font information portion in the RAM and a second clock source for accessing the microprocessor information portion in the RAM.

Known laser beam printers use two large memory systems. The first holds the page information to be printed. This is necessary since printing a page cannot begin until the entire page has been received. Moreover, more efficient use of time results if a second page can be inputted while the printing of the first page is still going on. Still further, it is desirable that a multiple page report be stored within the printer so that multiple sets can be printed without need for retransmission.

The second memory holds font information. This information must be "looked up" every time a character is printed, and the quantity of the information depends on the number of fonts to be printed on a job, the size of the character boxes, and the number of characters in a font.

It is possible to combine these memories in a single random access memory (RAM). During a printing portion of a print cycle, the RAM must be totally dedicated to the providing of font information and must be provided at such a speed that the process cannot be microprocessor controlled but must be hardware controlled. However, during the non-printing portion of a print cycle font information is not needed so the RAM can be accessed by the microprocessor as required. The hardware for accessing font information requires a clock generator, the output of which can be used to provide the Row Address Strobe (RAS) with the microprocessor requiring a separate clock generator for accessing information in the RAM for the microprocessor with such clock generator used to provide the Row Address Strobe (RAS). A problem is presented with respect to switching from one clock generator to the other clock generator in that the RAM is intolerant of any imperfect RAS clock cycle. Data is lost if a clock cycle used for a Row Address Strobe is shortened which can occur when a change from one clock generator to the other is implemented causing great problems even if such occurrence is only once every 10,000,000 cycles.

SUMMARY OF THE INVENTION

The invention presented herein solves the problem of providing perfect RAS clock cycles to the RAM of a microprocessor controlled laser printer wherein the RAM is used for the storage of microprocessor information plus storage of font information for laser output control with a microprocessor clock generator providing a clock source for use in accessing information for the microprocessor stored in the RAM and a font look-up clock generator providing a clock source for use in accessing font information stored in the RAM. The invention presented herein provides clock switching circuitry for such a printer including a switch means operatively connected to the output of each of the clock generators and the microprocessor, the switching means having an output to which the output of the clock generators are alternately connected in response to a control signal from the microprocessor. A lockout circuit portion is also used that is operatively connected to the output of the switching means, the RAM and the microprocessor for determining when signals at the output of the switching means can be presented to the RAM. In one embodiment, the lockout circuit portion includes a gate circuit having one input connected to the output of the switching means and having an output operatively connected to the RAM with a flip-flop circuit provided that is operatively connected to the microprocessor, the microprocessor clock generator and a second input of the gate circuit. The flip-flop circuit provides a lockout signal to a second input of the gate circuit in response to a lockout request signal from the microprocessor and a clock signal from the microprocessor clock generator. The lockout signal continues until the lockout request signal to the flip-flop circuit from the microprocessor is removed and a clock signal is subsequently received from the microprocessor clock generator. The lockout signal when presented to the gate circuit prevents the appearance of signals at the output of the gate circuit that are received at the one input of the gate circuit from the switching means.

BRIEF DESCRIPTION OF THE DRAWINGS

A better understanding of the invention presented herein, including its novel features and advantages will be obtained upon consideration of the following detailed description and accompanying drawings wherein.

DETAILED DESCRIPTION

Figure 1:
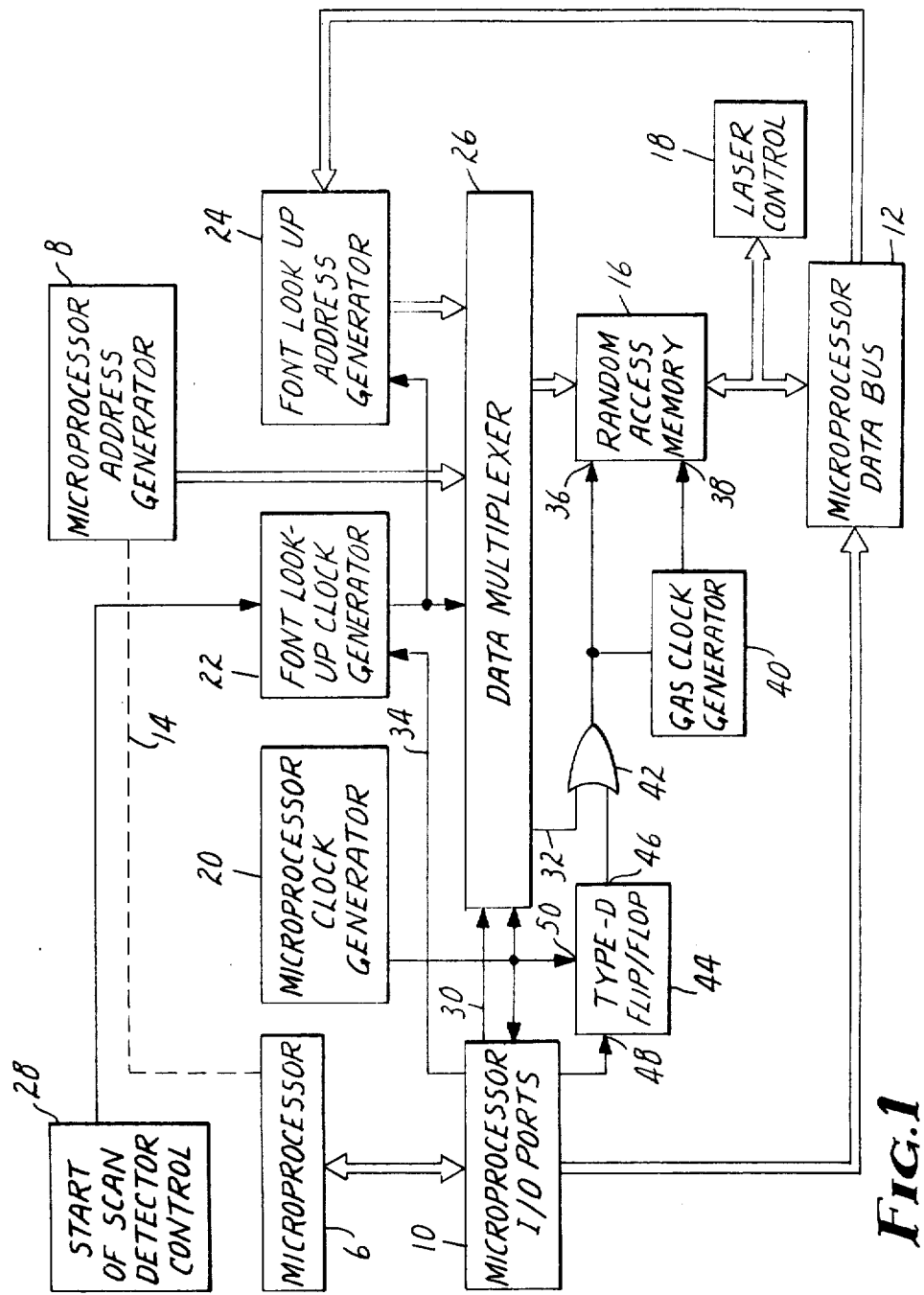
FIG. 1 is an electrical block diagram of part of the circuitry for a laser printer embodying the invention.

Referring to FIG. 1 of the drawing, a portion of circuitry for a laser printer embodying the present invention is shown and includes a microprocessor indicated at 6 with the address generator 8, the input/output (I/O) ports 10 and the data bus 12 of the microprocessor indicated separately. The dotted line 14 is used to indicate that the address generator 8 is a part of the microprocessor 6. The circuitry further includes a random access memory (RAM) 16 which is connected to the microprocessor data bus 12, the laser control 18 of the printer and to a data mutiplexer 26. Font information is stored in one portion of the RAM 16 while another portion of the RAM is used to store information for the microprocessor 6 including information supplied via the microprocessor regarding the characters to be printed for one or more pages. A microprocessor clock generator 20 is included and is used to provide the Row Address Strobe (RAS), from which the Column Address Strobe (CAS) is obtained, to strobe the RAM 16 when the microprocessor information is being addressed. A font look-up clock generator 22 is also provided for use in providing the RAS and CAS when font information in the RAM 16 is being addressed. The microprocessor address generator 8 and a font look-up address generator 24, including any required buffering, are connected to the RAM 16 via the data multiplexer 26. The font look-up address generator 24 is also connected to the microprocessor data bus 12 for receiving character information obtained from the RAM 16 and to the font look-up clock generator 22.

Clock switching circuitry is provided for the laser printer described that includes a switch means, which can be provided by the data multiplexer 26, that is connected to the output of each of the clock generators 20 and 22 and to the microprocessor as indicated by conductor 30. Functionally, the switch means is a single-pole double-throw switch which in one position connects the output of clock generator 20 to the output conductor 32 of the switch means and in the second position connects the output of clock generator 22 to the output conductor 32. The switch means provided by the data multiplexer 26 responds to a control signal from the microprocessor 6 via the I/O ports 10 to operate the switch means so that a different one of the clock generators 20 and 22 is connected to the output conductor 32.

The laser printer is one which has a duty cycle of less than 50%, such as would be provided by a laser printer utilizing a resonant scanner, so the font look-up clock generator 22 is enabled only when it is to be used in connection with accessing font information from the RAM 16 and is disabled when the portion of the last printable character in a line has been printed. An enabling signal is supplied from a start of scan detector control 28, while the signal to disable the clock generator 22 is provided on conductor 34 by the microprocessor 16 via the I/O ports 10.

When stored font information is to be accessed, the font look-up clock generator 22 output is used to provide the needed RAS at the input 36 of the RAM 16 and provide the basis for production of the CAS needed at the input 38 of RAM 16. Similarly, when stored microprocessor information is to be accessed, the clock generator 20 output is provided at the conductor 32 connected to the data multiplexer and is used to provide the needed RAS and CAS at input 36 and 38, respectively, of the RAM 16.

Before condsidering any of the other circuitry of FIG. 1, which includes the remainder of the clock switching circuitry, the invention presented herein will be better understood if a description is first given of the general operation of the circuitry described to this point. The microprocessor 6 and its microprocessor clock generator 20, address generator 8, I/O ports 10 and microprocessor data bus 12 are used to access data in the RAM 16 and enter data in the RAM 16 during non-printing portions of the operation of the printer. For such accessing and entry of data, the microprocessor clock generator 20 is used to provide the RAS and CAS to the inputs 36 and 38, respectively, of the RAM 16. The microprocessor 6 provides a control signal to the data multiplexer 26 via the conductor 34 to make the output of the clock generator 20 available at the conductor 32 for use in providing the RAS and CAS. Thus, information to be printed is received by the microprocessor 6 and is entered in the RAM 16 via the I/O ports 10 and the microprocessor data bus 12. When information stored in the microprocessor portion of the random access memory 16 is to be printed, it is accessed using the microprocessor address generator 8 and is supplied to the microprocessor data bus 12 for transfer to the buffer of the font look-up address generator 24. This information is supplemented during times when printing is not taking place, i.e., during each return portion of the resonant scanner of the printer. During the print portion of a resonant scanner cycle, the RAM 16 must be totally dedicated to the providing of font information based on the character information that has been stored in its buffer. This must occur at such a speed that the process cannot be controlled by the microprocessor but must be hardware controlled requiring the use of the font look-up clock generator 22 which is made available at the output conductor 32 of the data multiplexer 26 in response to a control signal provided by the microprocessor via the conductor 30. The font look-up generator 22 is enabled as the print portion of a scan begins by a signal received from a start of scan detector control 28. The font information that is accessed in the RAM access memory 16 is supplied to the laser control 18 to cause the laser to be turned on and off in accordance with the font information received from the RAM 16. When the scanner reaches the last printable character on a line, the microprocessor 6 is informed by the laser control 18 and provides a signal on conductor 34 to the font look-up clock generator 22 which inhibits any further clock signals from being produced by the generator 22 until the generator 22 is again enabled by the start of scan detector control 28.

While it would appear that the clock signals provided at the conductor 32 could be applied directly as the RAS clock for the RAM 16 and could be applied directly to a CAS clock generator 40 for the production of the CAS clock, the RAM 16 is intolerant of any imperfect RAS clock cycles which could be produced if the control signal applied to the data multiplexer 26 (switching means) via the conductor 30 is applied at such a time that the switching done by the data multiplexer 26 occurs during a RAS cycle. This would cause the loss of data. Even if this happens only once every 10 million cycles or so, great problems arise. This problem is avoided or solved by the invention presented herein wherein the clock switch circuitry that has been described to this point also includes a lockout circuit portion that is operatively connected to the output 32 of the described switching means, the RAM 16 and the microprocessor 6, via the I/O ports 10 for determining when signals at the output conductor 32 can be presented to the RAS input 36 of the RAM 16 and to the CAS clock generator 40 for production of the CAS clock. The circuitry of FIG. 1 shows one embodiment for such lockout circuit portion which includes a gate circuit 42 and a flip-flop circuit 44. In the arrangement shown in FIG. 1, the gate circuit 42 is an OR gate and the flip-flop circuit 44 is a "D" type flip-flop. The gate circuit 42 has one of its two inputs connected to the conductor 32 at which the output from either of the clock generators 20 and 22 will appear and has its other input connected to the Q output 46 of the "D" type flip-flop circuit 44. The "D" input 48 of the flip-flop circuit 44 is connected to the I/O ports 10 of the microprocessor 6 for receiving lockout request signals. The clock input 50 of the flip-flop circuit 44 is connected to the microprocessor clock generator 20. The output of the gate circuit 42 is connected to the RAS input 36 of the RAM 16 and is also connected to the CAS clock generator 40 which has its output connected to the CAS input 38 of the RAM 16.

The gate circuit 42 serves to prevent RAS clocks at the conductor 32 from reaching the RAS input 36 of the RAM 16 whenever a "lockout" signal is provided to the gate circuit 42 from the Q output 46 of flip-flop circuit 44. As will be seen, this lockout signal is switched from normal to lockout and back at times when it is known that the signal on the conductor 32 is high. An explanation of the operation of circuitry involving the flip-flop circuit 44 and the gate circuit 42 will be explained in connection with FIG. 2 of the drawing which shows the signals that are present at the various points in the circuitry. The various signals shown in FIG. 2 are identified by using the same reference numerals as are used in FIG. 1 to identify the source or point at which the various signals are presented.

Figure 2:
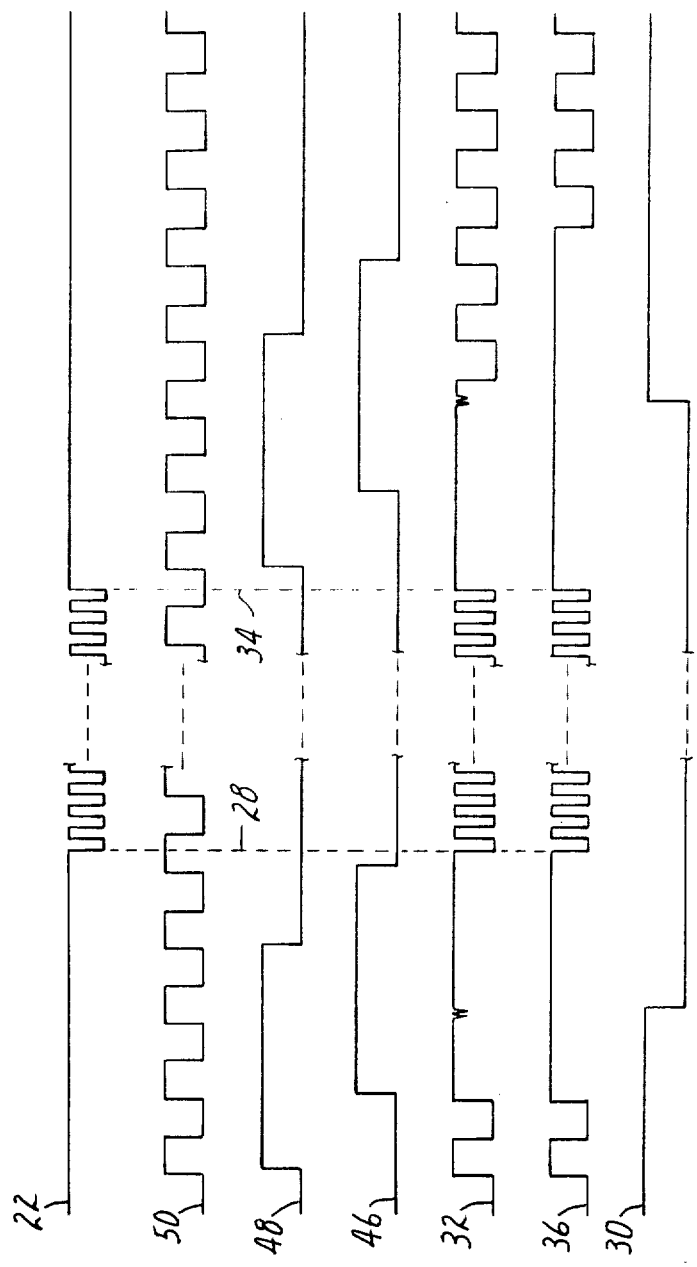
FIG. 2 is a showing of clock signals and control signals provided at various times by the circuitry of FIG. 1.

The signals are shown in FIG. 2 as beginning at a time when the scanner is in a non-printing mode and the microprocessor 6 knows that a forward or printing scan is about to start soon. This being the case, the microprocessor 6 causes a lockout request signal to be supplied via the I/O ports 10 to the "D" input 48 of the flip-flop 44. The lockout request signal is indicated by the high or logic one signal that is presented near the start of the signal sequence indicated at 48 in FIG. 2. The output of the microprocessor clock generator 20 is shown at 50 of FIG. 2 and is applied to the clock input 50 of the flip-flop circuit 44. Referring to the signal at 46 of FIG. 2 which is for the Q output 46 of the flip-flop 44, it can be seen that the Q output 46 goes high upon receipt of the first high received at the clock input of flip-flop 44 subsequent to the start of the lockout request signal which is a high or logic one signal received from the microprocessor 6 at the "D" input 48 of flip-flop circuit 44. Prior to the Q output 46 going high, the output of the gate circuit 42 is in accordance with the output of the microprocessor clock generator 20 which is indicated at 50 in FIG. 2 and is then present at conductor 32. Following the appearance of a lockout signal at the Q output 46 of the flip-flop 44, the microprocessor 6 switches the state of the control signal applied via conductor 30 to the data multiplexer 26 to a low condition causing the data multiplexer 26 to switch so the conductor 32 will be receiving the output that is present at the font look-up clock generator 22. As indicated at the signal 32 of FIG. 2, a bad clock might appear on the conductor 34 at the time the state of the signal on control line 30 is changed but such a clock is not presented at the output of the gate circuit 42 since the signal 46 present at the Q output 46 of the flip-flop is high causing the output of gate circuit 42 to be high. Referring to the signal 48 of FIG. 2, the microprocessor then removes the lockout request signal at 48 so a logic zero signal is presented to the "D" input 48 of the flip-flop 44. On the next rising clock signal provided by the microprocessor clock generator 20 as indicated at 50 in FIG. 2, the lockout signal at the Q output 46 of the flip-flop 44 is replaced with a low or logic zero signal. As can be seen by the signal at 22 in FIG. 2, the font look-up clock generator 22 is not providing any clock signals, but remains high. The start of scan detector control 28 operates to provide a start of scan pulse at the time indicated by the dotted line 28 in FIG. 2 causing the font look-up clock generator 22 to operate. The clock signals from generator 22 appear at the conductor 32 and are passed by the gate circuit 44 to the RAS input 36 of the RAM 16 and to the CAS clock generator 40. The RAM 16 is then addressed only by the font look-up address generator 24 which is also receiving the clock signals from generator 22. It should be appreciated, however, that the microprocessor has the use of other parts of the system at this time and does, in fact, continue with all operations which do not require use of the RAM 16. The print portion of the scan continues until the last printable character for the line scan is generated causing an end of line signal to be produced by the laser control 18 which is noted by the microprocessor 6 causing it to provide an inhibit signal on the conductor 34 to the font look-up clock generator 22 via the I/O ports 10 so that no further clock signals are produced by the clock generator 22. This is indicated as occurring at the time identified by the dotted line 34 of FIG. 2. The end of line signal also indicates to the microprocessor 6 that the laser control 18 has no further reason for control of the RAM 16. Accordingly, the microprocessor 6 operates to produce the second lockout signal which is the second high or logic one signal that is shown in the signal 48 in FIG. 2. Occurrence of the next high from the microprocessor clock generator 20, as shown at 50 in FIG. 2, causes the Q output 46 of flip-flop 44 to present a lockout or logic one signal so that no clock signal appearing at conductor 32 will be presented at the output of the gate circuit 42. Referring to signal 30 in FIG. 2, the microprocessor then changes the signal on the control line 30 so that a high or logic one is presented to the data multiplexer 26 causing the data multiplexer to switch so that the conductor 32 will receive clock signals from the microprocessor clock generator 20. While clock signals from the clock generator 20 are then present at the conductor 32 they are not presented at the output of the gate circuit 42 due to the lockout signal that is present at the other terminal of the gate circuit 42 as indicated by the signal 46 of FIG. 2. The microprocessor 6 then operates to remove the lockout request signal, as indicated at 48 of FIG. 2, causing removal of the lockout signal present at the Q output 46 of the flip-flop 44. The gate circuit 42 can then pass the clock signals provided by the microprocessor clock generator 20, as indicated by the signal 36 in FIG. 2, to the RAS input 36 of RAM 16 and to the CAS clock generator 40. Until the laser control 18 informs the microprocessor 6 that another forward scan is about to start soon, the clock signals provided by the microprocessor clock generator 20 continue to be presented to the random access memory 16.

It can be seen by the foregoing that all of the required random access memory can be provided by a single system and can be properly accessed using two clock generators so the cost of memory is much lower than the cost of a two random access memory system. In addition the advantage of the laser printer that has been described is less expensive than comparable systems and in view of its lower parts count is, therefore, more reliable.

The particulars of the foregoing description are provided merely for purposes of illustration and are subject to a considerable latitude of modification without departing from the novel teachings disclosed therein. Accordingly, the scope of this invention is intended to be limited only as defined in the appended claims, which should be accorded a breadth of interpretation consistent with this application.

I claim:

1. An improved microprocessor controlled laser printer that includes a microprocessor; memory for storage of microprocessor information plus memory for storage of font information for laser output control; a microprocessor clock generator having an output providing clock signals for use in accessing the microprocessor information; and a font look-up clock generator having an output providing clock signals for use in accessing the font information; wherein the improvement includes a single random access memory (RAM) providing the memory for storage of the microprocessor information plus the font information; the microprocessor having a first output at which control signals are provided and a second output at which lockout request signals are provided; and a clock switching circuitry for said RAM having a switch means connected to the output of the microprocessor and font look-up clock generators and to said first output of the microprocessor, said switching means having an output at which the clock signals of the microprocessor and font look-up clock generators are alternately provided in response to said control signals from said first output of the microprocessor and said clock switching circuitry further including a lockout switch portion having one input connected to said output of said switch means and a second input connected to said second output of the microprocessor for receiving lockout request signals, said lockout switch portion having an output connected to said RAM, said lockout switch portion producing a lockout signal in response to a lockout request signal which prevents passage to said output of said lockout switch portion of clock signals presented at said output of said switch means, said lockout switch portion having a third input connected to the output of the microprocessor clock generator for receiving clock signals for timing operation of the lockout switch portion for the initiation and termination of a lockout signal relative to the start and end of a lockout request signal.

2. A microprocessor controlled laser printer according to claim 1 wherein said lockout switch portion includes a gate circuit providing said one input and said one output of said lockout switch portion; and a flip-flop circuit providing said second and third inputs of said lockout switch portion, said flip-flop circuit having an output at which said lockout signal is provided, said output of said flip-flop circuit connected to said gate circuit, said lockout signal when presented to said gate circuit from said output of said flip-flop circuit prevents passage via said gate circuit of clock signals presented at said one output of said switch means to said one output of said lockout switch portion.

* * * * *